(12) United States Patent
Watson et al.

(10) Patent No.: US 6,810,905 B1
(45) Date of Patent: Nov. 2, 2004

(54) PROPANE OVERFLOW PROTECTION VALVE

(75) Inventors: Virgil Allen Watson, Salem, IA (US); Raymond Simon Hodyniak, Jr., Roscoe, IL (US)

(73) Assignee: Raall Corp., Salem, IA (US)

( * ) Notice: Subject to any disclaimer, the term of this patent is extended or adjusted under 35 U.S.C. 154(b) by 0 days.

(21) Appl. No.: 10/661,252

(22) Filed: Sep. 12, 2003

(51) Int. Cl.$^7$ .................. F16K 31/20; F16K 31/26; F16K 33/00

(52) U.S. Cl. ............... 137/446; 137/15.26; 137/449; 141/198

(58) Field of Search .................. 137/15.26, 434, 137/442, 446, 449; 141/198

(56) References Cited

U.S. PATENT DOCUMENTS

| | | | | |
|---|---|---|---|---|
| 1,005,044 A | * | 10/1911 | Koch | 137/445 |
| 1,044,311 A | * | 11/1912 | Wall | 137/449 |
| 1,538,404 A | * | 5/1925 | Laird | 137/446 |
| 1,551,808 A | * | 9/1925 | Dixon | 137/449 |
| 1,623,374 A | * | 4/1927 | Anderson | 137/449 |
| 1,796,443 A | * | 3/1931 | Da Costa | 137/446 |
| 2,504,638 A | * | 4/1950 | Browning | 137/446 |
| 3,189,039 A | | 6/1965 | Bauer | 137/434 |
| 3,756,269 A | * | 9/1973 | Brown | 137/446 |
| 4,462,417 A | | 7/1984 | Trinkwalder, Jr. | 137/39 |
| 4,541,464 A | * | 9/1985 | Christiansen | 141/198 |
| 5,282,496 A | | 2/1994 | Kerger | 141/18 |
| 5,460,197 A | | 10/1995 | Kerger et al. | 137/39 |
| 5,472,012 A | | 12/1995 | Wood et al. | 137/416 |
| 5,887,609 A | | 3/1999 | Garretson | 137/2 |
| 6,076,546 A | | 6/2000 | Waters | 137/390 |
| 6,109,295 A | * | 8/2000 | Santana | 137/449 |
| 6,227,233 B1 | * | 5/2001 | Kozik | 137/446 |
| 6,408,869 B1 | | 6/2002 | Bartos et al. | 137/414 |
| 6,536,465 B2 | * | 3/2003 | David et al. | 137/442 |
| 2004/0031522 A1 | * | 2/2004 | Kozik et al. | 137/446 |

FOREIGN PATENT DOCUMENTS

EP 0 955 496 A1 10/1999

* cited by examiner

*Primary Examiner*—George L. Walton
(74) *Attorney, Agent, or Firm*—McKee, Voorhees & Sease, P.L.C.

(57) ABSTRACT

An overflow protection device includes a valve body having an inlet conduit passing vertically therethrough. The inlet conduit includes an outlet end below a valve chamber. A valve within the valve chamber is movable between and open and closed position. A float is pivotally mounted below the valve and the float cams, an actuator upwardly when the float experiences a less than full tank and cams the actuation downwardly to permit the valve to move downwardly when the float rises to a predetermined level as it floats on the liquid within the tank.

15 Claims, 4 Drawing Sheets

PROPANE OVERFLOW PROTECTION VALVE

BACKGROUND OF THE INVENTION

The present invention relates to an overflow protection device. Specifically relates to an overflow protection device for a pressurized gas tank.

Pressurized gas tanks are often used for containing liquid propane, but the present invention relates to tanks which may contain other gases that are under pressure to the point where they are in a liquid form.

Many of these gases expand substantially by volume for every 10° F. to which the tank is exposed. For example, liquid propane expands at approximately 1.5% by volume per 10° F. Propane tanks are designed so that when they contain the specified weight of propane at 60° F., approximately 20% by tank volume remains available for expansion of the liquid. The present invention is intended to ensure the tanks are not filled beyond this expansion space.

Overflow protection valves currently available and in widespread use do not necessarily ensure this protection. They often contain excessive numbers of operating and sealing components. Also they are often gas pressure operated and therefore performance depends upon pressures created by the fill equipment. Performance is also subject to false triggers where with rapid and fast start up of incoming gas the overflow protection valves accidentally shut down. Many overflow protection valves are of large diameters that interfere with the outage tube extending from the bottom of the main supply valve.

Therefore, a primary object of the present invention is the provision of an improved overflow protection valve and method for operating same.

A further object of the present invention is the provision of an overflow protection device that utilizes a simple ball/seat design, thereby eliminating gas driven pistons.

A further object of the present invention is the provision of a valve that eliminates the use of elastomeric components which often become damaged or corroded as a result of exposure to certain gases.

A further object of the present invention is the elimination of springs used in prior overflow protection devices.

A further object of the present invention is the provision of an improved overflow protection device which eliminates the elastomeric seals that often can be contaminated with oils, rust and water found within the propane that quickly degrade the seal integrity and thereby cause a loss of pressure or high co-efficient of friction between the seal and the cylinder.

A further object of the present invention is the provision of an improved overflow protection device that eliminates gas driven pistons that impede the flow of incoming liquid, but to do so require a central gas port to direct energy under the piston for its moving power.

A further object of the present invention is the elimination of gas pressure ports used to port vacuum or pressure to the usable side of a piston. Usually these ports are in the 0.050 to the 0.060 diameter range and are subject to plugging by rust and other particulate matter naturally present in propane.

A further object of the present invention is the provision of a reduction in the diameter of the valve, thereby eliminating interference normally encountered with the main supply valves outage tube.

A further object of the present invention is the provision of a ball retainer that serves three distinct functions: 1) It prevents the ball from elevating during gas discharge and blocking or impeding the flow of gas through the inlet and vapor port. 2) The legs of the ball retainer provide a cage to control the ball axially above the seat and in approximate vertical alignment with the ball lift pin thereby reducing side loading on the lift pin. 3) A convex top directs incoming liquid around the ball reducing the frictional loading on the ball and subsequently on the operating mechanism. There are four ribs that provide space for incoming liquid to pass around the retainer and which prevent the expansion of the incoming liquid to vapor until after the liquid is below the center line of the ball. This results in lowered pressure below the ball, and when the ball is free to move downwardly it will do so in response to this pressure differential.

A further object of the present invention is the positioning of the exhaust ports as high as possible in the tank so as to prevent liquid propane from entering the ports during appliance use of the propane within the tank, particularly when the tank is exposed to high temperature.

A further object of the present invention is the provision of a lower body design that incorporates exhaust ports that are oriented at 90° to the float arm's operating plane, thereby directing the incoming propane away from the float.

A further object of the present invention is the provision of a ball/seat arrangement that in concert provide a valve that operates at all pressures, especially those in very low pressure ranges.

A further object of the present invention is the provision of a valve that upon failure permits the valve ball to naturally fall into the seat, thereby preventing fill and requiring service.

A further object of the present invention is the provision of a valve that provides extremely high flow rates of both vapor and gas in both directions.

A further object of the present invention is the provision of an improved valve that is economical to manufacture, durable in use, and efficient in operation.

SUMMARY OF THE INVENTION

The foregoing objects may be achieved with an overflow protection device that includes a valve body having a gas conduit extending through the valve body. The gas conduit comprises a conduit inlet opening for introducing pressurized gas, a conduit outlet opening for permitting the pressurized gas to exit, and a valve chamber between the conduit inlet opening and the conduit outlet opening. A valve is within the valve opening and is mounted for movement from a closed position preventing pressurized gas from passing from the conduit inlet opening to the conduit outlet opening to an open position permitting pressurized gas to pass from conduit inlet opening to the conduit outlet opening. The valve is biased to the closed position by the pressure of the pressurized gas from the conduit inlet opening. A float is movably mounted to the valve body. A cam is associated with the float and is movable in response to the movement of the float between a full position and a less than full position. An actuator is mounted for movement within the valve body and is in engagement with the cam. The actuator is movable in response to the movement of the float to the less than full position to engage the valve and hold the valve in the open position. The actuator is movable in response to movement of the float to the full position to withdrawn from the valve and permit the valve to move to the closed position.

According to another feature of the present invention, a valve retainer is positioned between the valve and the conduit inlet opening of the valve body.

According to a further feature of the present invention, the valve retainer includes a valve cavity partially surrounding the valve.

According to another feature of the present invention, the valve includes four sides surround the valve cavity. A first two of the four sides are adjacent one another and have a first length. A second two of the four sides are adjacent one another and have a second length less than the first length, so as to imbalance the pressure on the ball and bias it to its closed position when the actuator is withdrawn.

According to another feature of the present invention, at least one of the first two of the four sides includes a lower edge having a notch formed therein.

According to another feature of the present invention, the valve cavity is partially spherical in shape and the valve is a ball.

According to another feature of the present invention, the actuator comprises a pin and the valve body includes a pin bore loosely housing the pin. A pin includes an upper end within at least a portion of the conduit between the valve and the conduit outlet opening.

According to another feature of the present invention, the float and the cam are rigid with respect to one another so that the cam moves in unison with the float.

According to another feature of the present invention, the cam includes a first cam surface engaging the actuator during the time that the actuator holds the valve in an open position and includes a second cam surface engaging the actuator during the time that the actuator permits the valve to move to its closed position.

While the above invention may be utilized in combination with a pressurized gas tank for any of a plurality of gases, the preferred form of the invention is for use with a propane gas tank.

The foregoing objects may be achieved by the method of the present invention by connecting a valve body within the gas chamber to the gas inlet opening. The valve body includes a conduit comprising a conduit inlet end in communication with the gas inlet opening, a conduit outlet opening for introducing pressurized gas into the gas chamber, and a valve chamber between the inlet opening and the outlet opening.

The method further comprises positioning a valve in the valve chamber, the valve being movable from an open position permitting the pressurized gas to flow from the conduit inlet opening through the conduit outlet opening to a closed position preventing the pressurized gas from flowing from the conduit inlet opening to the conduit outlet opening. A float is mounted to the valve body for movement from a less than full position to a full position, the float having a cam surface thereon. An actuator is engaged with the cam surface. The actuator has a first end engaging the cam surface and a second end positioned adjacent the valve. The method includes moving the actuator to engage the valve and hold the valve in the open position in response to movement of the float and the cam to the less than full position.

The method further comprises moving the actuator to withdraw from engagement with the valve so as to permit the valve to move to the closed position in response to movement of the float and cam to the full position. The valve is biased to its closed position. However, the valve is always free to move to its open position by being pushed upwardly out of the way of discharging gas.

DETAILED DESCRIPTION OF THE PREFERRED EMBODIMENT

Figure 1:
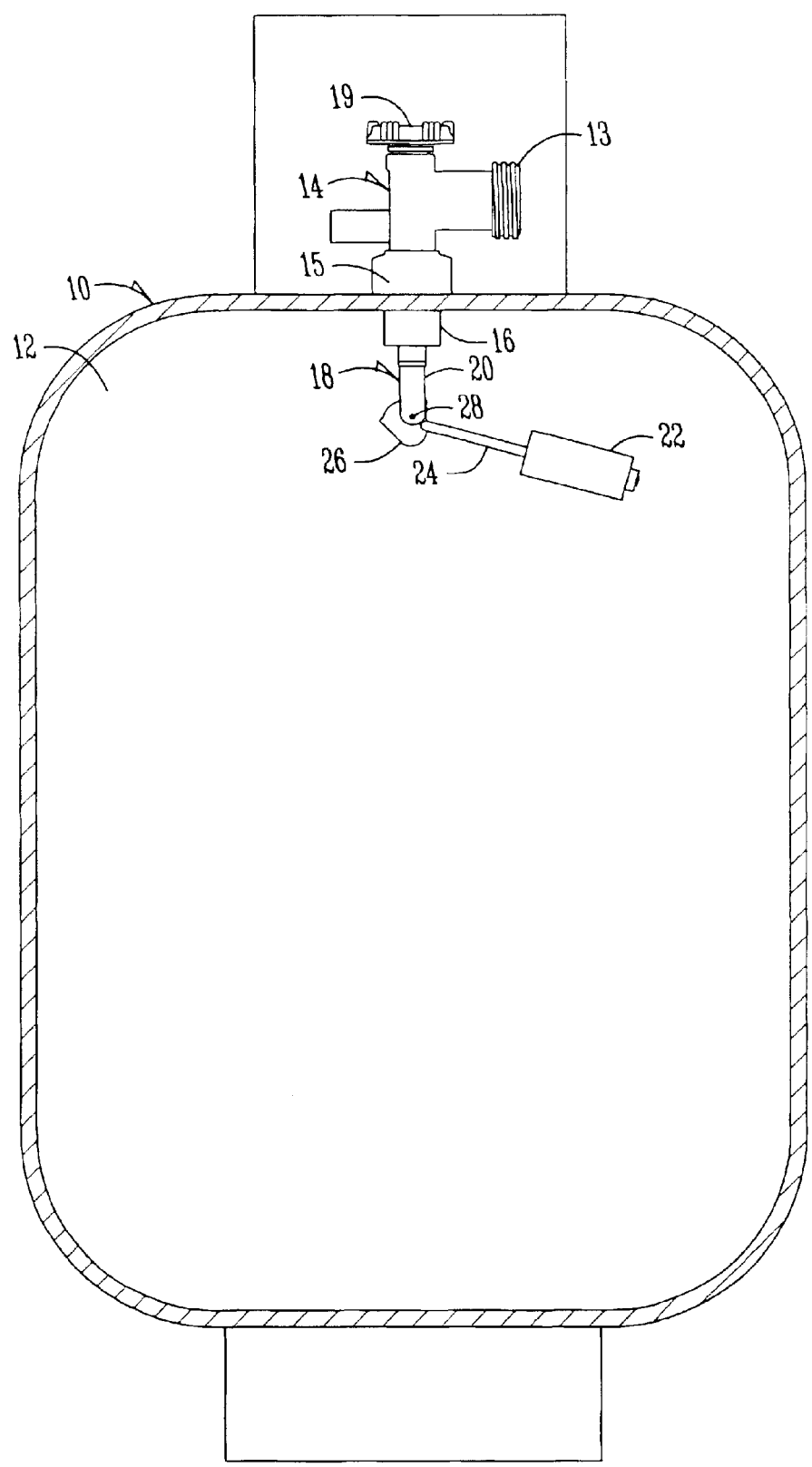
FIG. 1 is a sectional view of a pressurized gas tank showing the overflow protection valve mounted therein.

Referring to FIG. 1, the numeral 10 generally designates a pressurized fluid tank having a gas chamber 12 therein. A main supply valve 14 of conventional construction is mounted within a tank gas inlet opening 16 to provide communication from the exterior to the gas chamber 12. The main supply valve 14 includes an inlet 13 adapted to be mounted to a source of pressurized gas, an outlet 15 adapted to be mounted to an overflow protection device 18, and a hand valve 19 which may be moved to an open or closed position as desired. The overflow protection device 18 includes a valve body 20, a float 22 having a float arm 24 thereon and a cam 26 at the opposite end of the float arm from the float. The float, float arm, and cam are pivotally mounted to the valve body 20 for pivotal movement about axis 28.

Figure 2:
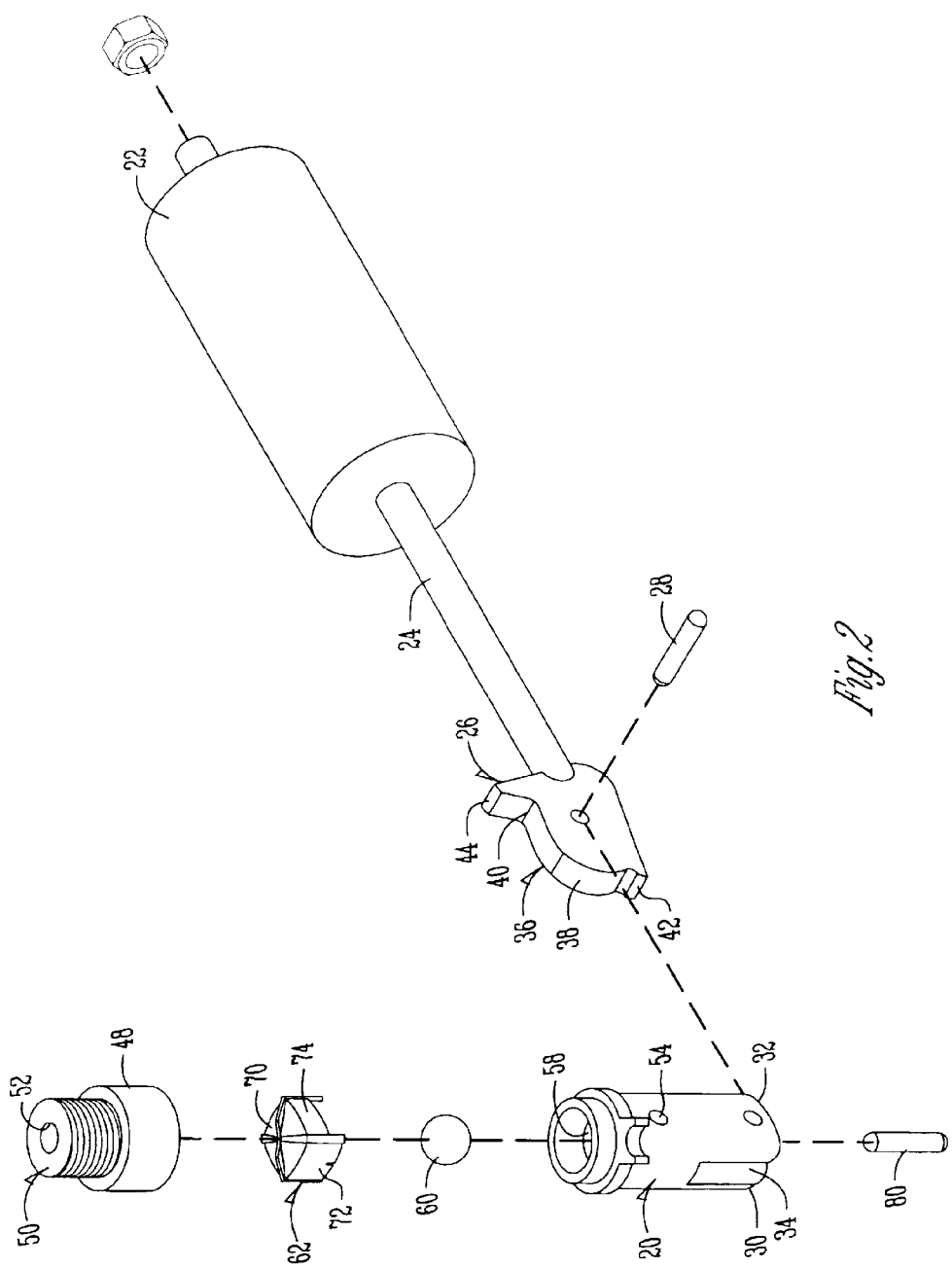
FIG. 2 is an exploded perspective view of the overflow protection device of the present invention.
Figures 3, 4:
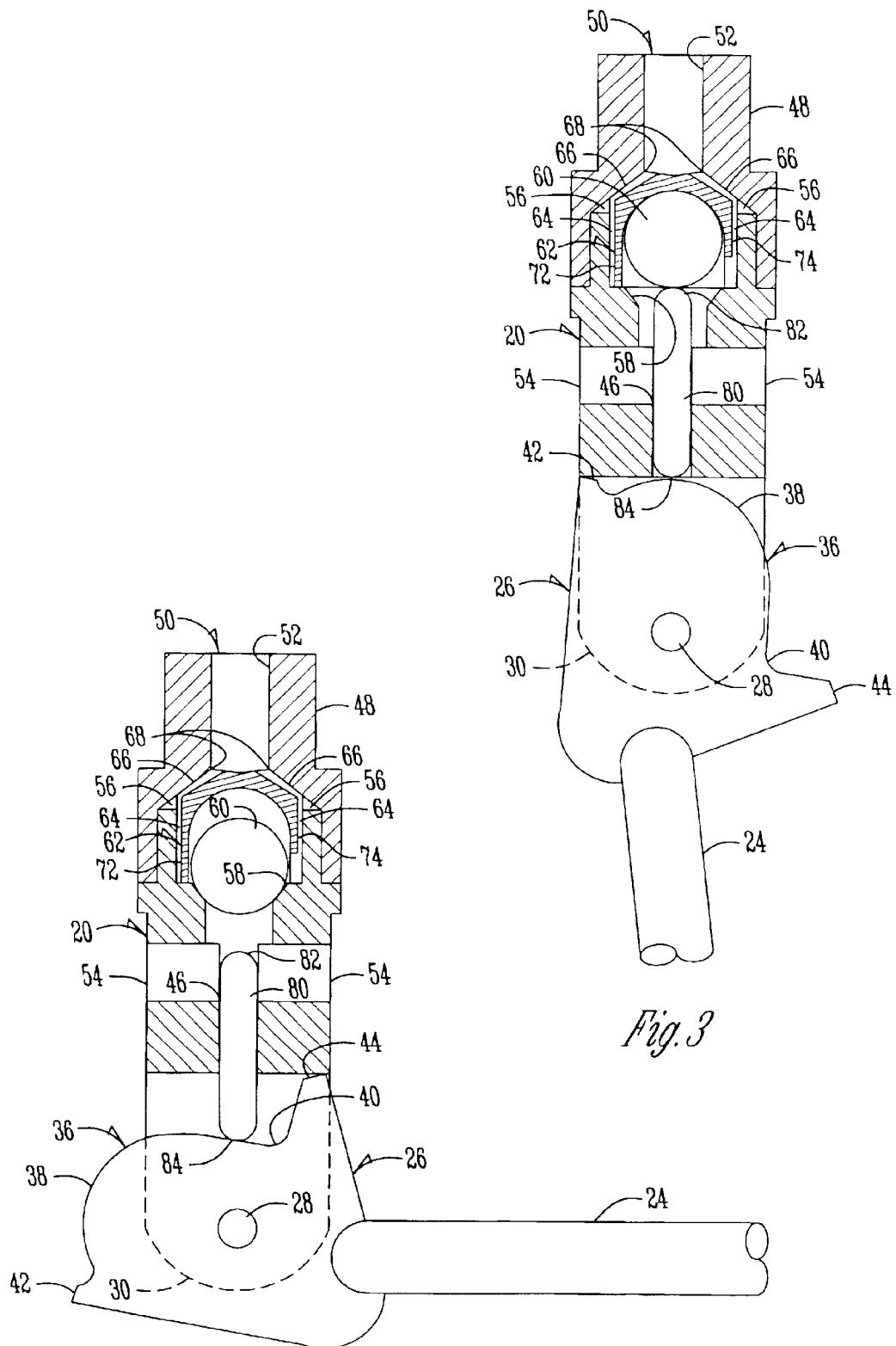
FIG. 3 is a sectional view showing the overflow protection device in its less than full position.
FIG. 4 is a sectional view similar to FIG. 3, but showing the overflow protection device in its full position.

Referring to FIGS. 2–4, the valve body 20 includes a first lower flange 30 and a second lower flange 32 which are spaced apart from one another to form a cam slot 34. The cam 26 is adapted to be fitted within the slot 34 and mounted therein for pivotal movement about the axis 28 provided by the pin shown in FIG. 2. The cam 26 includes a cam surface 36 which comprises a concentric portion 38 that is concentric to the pivotal axis 28, and a notch portion 40. At opposite ends of the cam surface 36 are two cam tabs 42, 44.

As shown in FIGS. 3 and 4, the valve body 20 includes a central vertical pin bore 46 therein. A valve body cap 48 is operatively secured over the valve body 20 by press fitting, welding, or the like.

A conduit 50 extends centrally downwardly through the valve cap 48 and the valve body 20 and includes a conduit inlet 52, a conduit outlet 54, and a valve chamber 56 between the conduit inlet 52 and the conduit outlet 54. As can be seen in FIGS. 3 and 4, the conduit outlets 54 comprise radial bores that communicate with the central bore provided by conduit 50. For purposes of illustration conduit outlets 54 are shown perpendicular to the axis 28 of float arm 24. However, it is preferred that conduit outlets 54 extend parallel to axis 28 to avoid engagement of the gas and/or liquid exiting therefrom with the float arm 24.

A cone shaped valve seat 58 is provided within the valve chamber 56 and a valve ball 60 is adapted to move from an unseated position shown in FIG. 3 to a seated position shown in FIG. 4 which engages the cone shaped valve seat 58 and prevents fluid from passing to the conduit outlets 54.

Figure 5:
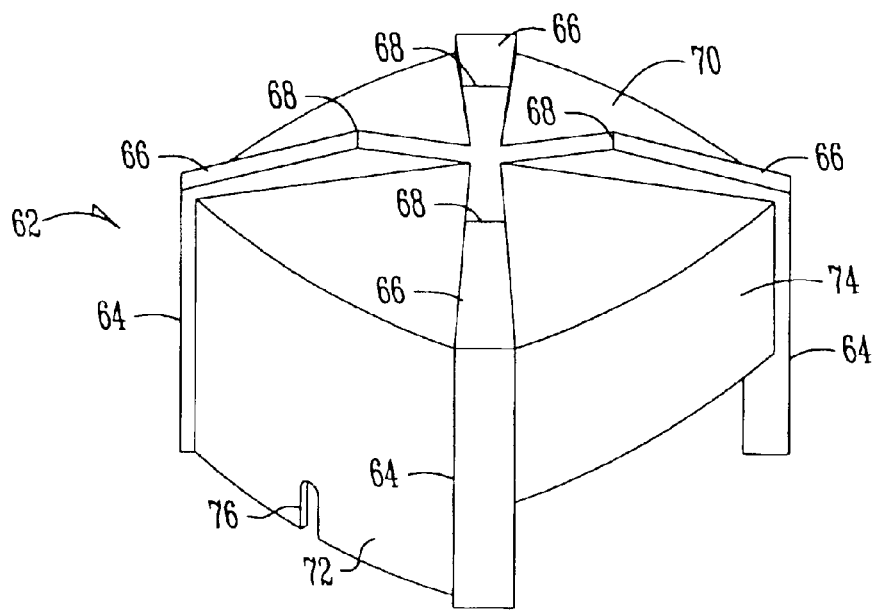
FIG. 5 is a perspective view of the unique retainer utilized with the present invention.
Figure 6:
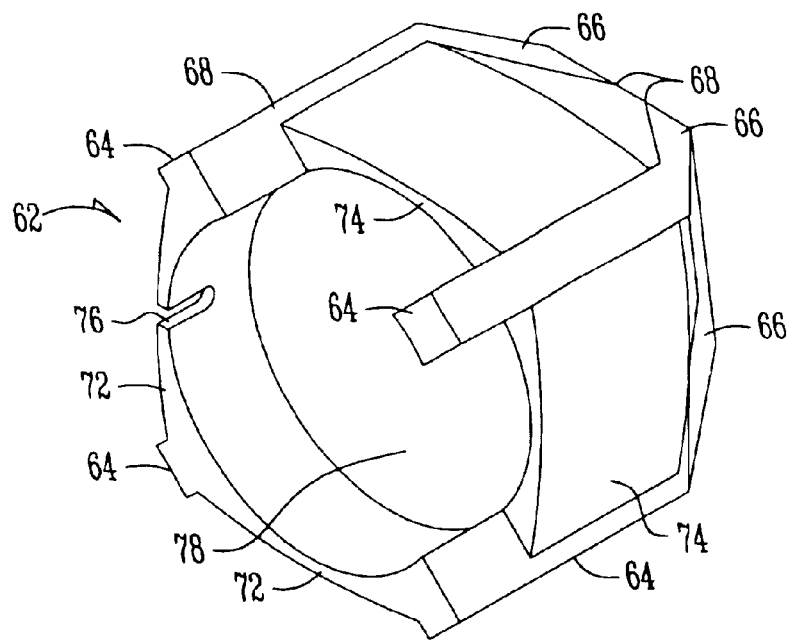
FIG. 6 is a perspective view of the retainer showing the bottom of the retainer.

A retainer 62 is shown in partial surrounding relationship over the valve ball 60. Retainer 62 includes four corner posts 64 (FIGS. 5 and 6) which are in communication with angled ridges 66 at the upper end of the retainer 62. The angled ridges terminate in pointed upper ends 68 which are positioned slightly above a retainer top 70. The retainer 62 includes two adjacent long side walls 72 and two adjacent short side walls 74. A notch 76 is provided in one of the long side walls 74. The retainer also includes a partial spherical cavity 78. The reason for the two short side walls is to expose the ball to unequal pressure from the propane being entered into the valve chamber 56, thereby preventing the ball 60 from becoming stuck or lodged within the cavity 78.

The retainer 62 is fixed within the upper cone shaped portion of valve cavity 56. Ribs 64, 66 create a space between the walls of valve cavity 56 and the retainer 62. The sum of this space approximates the cross section of conduit inlet 52 so as to prevent the expansion of the liquid into gas until after the liquid is below the center of the ball. Changing of the liquid to a gas below the center of the ball creates a bias of the ball in a downward direction as a result of the unequal pressure between the liquid above the ball and the gas below the ball. This bias urges the ball downwardly without need of springs and permits its downward movement when an actuator 80 moves downwardly.

An actuator pin 80 is mounted for vertical sliding movement within the pin bore 46. The actuator pin includes an upper end 82 which is slidably mounted within the conduit 50 and which engages the ball 60 when in its upper position shown in FIG. 3. The lower end 84 of pin 80 is in frictional contact with the cam surface 36 of cam 26.

In operation, the float 22 is in its lowermost position when the propane tank 10 is empty. In this position which is shown in FIG. 3, the concentric cam surface 38 engages the lower end 84 of pin 80 and forces the pin 80 upwardly so that the upper end of the pin 80 engages the ball 60. This lifts the ball upwardly out of engagement with the seat provided by the cone shaped valve seat 58. This permits the propane fluid under pressure to pass around the retainer 62 and the ball 60 and downwardly and outwardly through the conduit outlets 54 at the bottom of conduit 50. As the tank fills the float engages the upper surface of the liquid therein and begins floating upwardly. When the liquid reaches a predetermined height, the float 22 has pivoted from the position shown in FIG. 3 to the position shown in FIG. 4. In this position, the notch portion 40 of the cam surface 36 has moved adjacent the pin 80, and the pin 80 is permitted to drop downwardly so as to permit the valve 60 to drop downwardly in response to gravity and also in response to the pressure from the propane being submitted into the valve chamber 56. Valve 60 is biased downwardly by the imbalance of the liquid pressure above ball 60 and the expanded gas pressure below ball valve 60. When the ball 60 seats against the cone shaped seat 58, fluid can no longer pass from the inlet portion 52 of conduit 50 to the outlet conduits 54 of the conduit 50. This prevents pressurized fluid from over filling the tank 10. Preferably, the float 22 is set in such a manner that when the fluid within the tank 10 reaches approximately 80% of full, the ball 60 is permitted to seat against the cone shaped valve seat 58 as shown in FIG. 4.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An overflow protection device comprising:
    a valve body having a gas conduit extending through the valve body, the gas conduit comprising a conduit inlet opening for introducing pressurized gas, a conduit outlet opening for permitting the pressurized gas to exit, and a valve chamber between the conduit inlet opening and the conduit outlet opening;
    a valve within the valve opening and being mounted for movement from a closed position preventing pressurized gas from passing from the conduit inlet opening to the conduit outlet opening to an open position permitting pressurized gas to pass from the conduit inlet opening to the conduit outlet opening;
    the valve being biased to the closed position by the pressure of the pressurized gas from the conduit inlet opening;
    a float movably mounted to the valve body;
    a cam associated with the float and being movable in response to movement of the float between a full position and a less than full position;
    an actuator mounted for movement within the valve body and being in engagement with the cam, the actuator being movable in response to movement of the float to the less than full position to engage the valve and hold the valve in the open position and being movable in response to the movement of the float to the full position to withdraw from the valve and permit the valve to move to the closed position;
    a valve retainer within the valve opening and in engagement with the valve, the valve retainer being positioned between the valve and the conduit inlet opening of the valve body, wherein the valve retainer includes a valve cavity partially surrounding the valve, the valve retainer including at least four sides surrounding the valve cavity, a first two of the four sides being adjacent one another and having a first length, a second two of the four sides being adjacent one another and having a second length less than the first length.

2. The overflow protection device according to claim 1 wherein at least one of the first two of the four sides includes a lower edge having a notch formed therein.

3. The overflow protection device according to claim 1 wherein the valve cavity is partially spherical in shape and the valve is a ball.

4. The overflow protection device according to claim 1 wherein the valve chamber includes a valve seat, the valve being seated on the valve seat when the valve is in the closed position and being spaced from the valve seat when the valve is in the open position.

5. The overflow protection device according to claim 1 wherein the actuator comprises a pin and the valve body includes a pin bore loosely housing the pin.

6. The overflow protection device according to claim 5 wherein the pin includes an upper end, the upper end being within at least a portion of the conduit between the valve and the conduit outlet opening.

7. The overflow protection device according to claim 1 wherein the float and the cam are rigid with respect to one another so that the cam moves in unison with the float.

8. The overflow protection device according to claim 7 wherein the cam includes a first cam surface engaging the actuator during the time that the actuator holds the valve in the open position and includes a second cam surface engaging the actuator during the time that the actuator permits the valve to move to the closed position.

9. The overflow protection device according to claim 7 wherein the cam and float are pivotally mounted to the valve body.

10. In combination:

a pressurized gas tank having a gas chamber for receiving pressurized gas that takes the form of liquid when within the gas chamber, the gas chamber having a gas inlet opening for introducing pressurized gas to the gas chamber;

a valve body having a gas conduit in communication with the gas inlet opening and extending through the valve body, the gas conduit comprising a conduit inlet opening in communication with the gas inlet opening, a conduit outlet opening for permitting the pressurized gas to enter the gas chamber, and a valve chamber between the conduit inlet opening and the conduit outlet opening;

a valve within the valve chamber and being mounted for movement from a closed position preventing the pressurized gas from passing from the conduit inlet opening to the conduit outlet opening to an open position permitting the pressurized gas to pass from the conduit inlet opening to the conduit outlet opening;

the valve being biased to the closed position by the pressure of the pressurized gas from the gas inlet opening of the tank;

a float movably mounted to the valve body;

a cam associated with the float and being movable in response to movement of the float between a full position and a less than full position;

an actuator mounted for movement within the valve body and being in engagement with the cam, the actuator being movable in response to the cam to the less than full position to engage the valve and hold the valve in the open position and being movable in response to the cam to the full position to withdraw from the valve and permit the valve to move to the closed position;

a valve retainer within the valve opening and in engagement with the valve, the valve retainer being positioned between the valve and the conduit inlet opening of the valve body, wherein the valve retainer includes a valve cavity partially surrounding the valve, the valve retainer including at least four sides surrounding the valve cavity, a first two of the four sides being adjacent one another and having a first length, a second two of the four sides being adjacent one another and having a second length less than the first length.

11. The combination of claim 10 wherein the float is positioned to float on the upper surface of the liquid within the gas chamber, and being movable in response to the rise of the upper surface of the liquid to the full position when the upper surface of the liquid within the gas chamber reaches a predetermined maximum level within the gas chamber.

12. The combination of claim 11 wherein the cam is affixed to the float and causes the actuator to permit the valve to move to the closed position whenever the upper surface of the fluid is at the predetermined maximum level.

13. The method of preventing the overfilling of a pressurized gas tank having a gas inlet opening providing communication into a gas chamber within the tank for the introduction of pressurized gas in a liquid state, the method comprising:

connecting a valve body within the gas chamber to the gas inlet opening, the valve body including a conduit comprising a conduit inlet opening in communication with the gas inlet opening, a conduit outlet opening for introducing the pressurized gas into the gas chamber, and a valve chamber between the conduit inlet opening and the conduit outlet opening;

positioning a valve in the valve chamber, the valve being movable from open position permitting the pressurized gas to flow from the conduit inlet opening through the conduit outlet opening to a closed position preventing the pressurized gas from flowing from the conduit inlet opening to the conduit outlet opening, wherein the valve includes an actuator mounted for movement within the valve body and being in engagement with a cam, the actuator being movable in response to the cam to the less than full position to engage the valve and hold the valve in the open position and being movable in response to the cam to the full position to withdraw from the valve and permit the valve to move to the close position and a valve retainer within the valve opening and in engagement with the valve, the valve retainer being positioned between the valve and the conduit inlet opening of the valve body, wherein the valve retainer includes a valve cavity partially surrounding the valve, the valve retainer including at least four sides surrounding the valve cavity, a first two of the four sides being adjacent one another and having a first length, a second two of the four sides being adjacent one another and having a second length less than the first length;

mounting a float to the valve body for movement from a less than full position to a full position, the float having a cam surface thereon;

engaging an actuator with the cam surface, the actuator having a first end engaging the cam surface and a second end positioned adjacent the valve;

moving the actuator to engage the valve and hold the valve in the open position in response to movement of the float and the cam to the less than full position;

moving the actuator to withdraw from engagement with the valve so as to permit the valve to move to the closed position in response to movement of the float and cam to the full position; and biasing the valve to the closed position.

14. The method according to claim 13 wherein the step of biasing the valve is accomplished by the pressure of the pressurized fluid entering the valve chamber and acting upon the valve.

15. The method according to claim 13 wherein the actuator comprises a pin having a lower pin end engaging the cam surface and an upper pin end, the method further comprising moving the pin so that the upper pin end engages the valve in response to the movement of the float to the less than full position.

* * * * *